(12) United States Patent
Soryal

(10) Patent No.: US 12,332,662 B2
(45) Date of Patent: Jun. 17, 2025

(54) USING UNMANNED CONTROLLER EQUIPMENT TO LAUNCH AND RECOVER UNMANNED IMAGING EQUIPMENT

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 239 days.

(21) Appl. No.: 17/956,730

(22) Filed: Sep. 29, 2022

(65) Prior Publication Data

US 2024/0111302 A1 Apr. 4, 2024

(51) Int. Cl.
G05D 1/00 (2024.01)
B64U 70/00 (2023.01)
B64U 101/30 (2023.01)

(52) U.S. Cl.
CPC ............. *G05D 1/104* (2013.01); *B64U 70/00* (2023.01); *B64U 2101/30* (2023.01)

(58) Field of Classification Search
None
See application file for complete search history.

(56) References Cited

U.S. PATENT DOCUMENTS

| 6,712,312 | B1* | 3/2004 | Kucik | F42B 12/365 |
| | | | | 244/1 R |
| 9,305,280 | B1* | 4/2016 | Berg | B64U 2101/64 |
| 9,716,862 | B1* | 7/2017 | Evans | B64U 30/12 |
| 2005/0017129 | A1* | 1/2005 | McDonnell | B64C 25/68 |
| | | | | 244/110 G |
| 2014/0146173 | A1* | 5/2014 | Joyce | H04N 7/183 |
| | | | | 348/144 |
| 2016/0364989 | A1* | 12/2016 | Speasl | G08G 5/0069 |
| 2018/0050800 | A1* | 2/2018 | Boykin | H04N 21/2368 |
| 2020/0108924 | A1* | 4/2020 | Smith | F41H 11/02 |
| 2020/0184706 | A1* | 6/2020 | Speasl | H04L 9/0643 |

OTHER PUBLICATIONS

"Electromagnetic Field (EMF) Shielding Paints", Less EMF, https://lessemf.com/product-category/emf-shielding/paints/, 2024, 4 pp.
(Continued)

*Primary Examiner* — Daniel L Greene
(74) *Attorney, Agent, or Firm* — Guntin & Gust, PLC; Atanu Das

(57) ABSTRACT

The technologies described herein are generally directed to utilizing unmanned controller equipment to launch and recover unmanned imaging equipment in a fifth generation (5G) network or other next generation networks. For example, a method described herein can include receiving an indication that unmanned aerial equipment is to be captured. The method can further include, based on the indication, capturing the unmanned aerial equipment launched over a data collection area, resulting in captured unmanned aerial equipment. Further, the method can include, interfacing with the captured unmanned aerial equipment to download information associated with the data collection area collected by the unmanned aerial equipment during airborne transit over the data collection area.

20 Claims, 10 Drawing Sheets

(56) References Cited

OTHER PUBLICATIONS

"Satellites Could 3D Print Their Antennas In Space! Tech Under Development", Mitsubishi Electric, https://www.youtube.com/watch?v=cfmKM2a582w, May 22, 2022, 3 pp.

"System Architecture for the 5G System", Tech-invite, 3GPP space, TS 23.501, https://www.tech-invite.com/3m23/tinv-3gpp-23-501.html, Sep. 2024, 8 pp.

"The Advantages and Challenges of Biodegradable Electronic Components", cadence, PCB Design & Analysis, https://resources.pcb.cadence.com/blog/2021-the-advantages-and-challenges-of-biodegradable-electronic-components, 2021, 7 pp.

Gates, Dominic, https://replica.seattletimes.com/popovers/dynamic_article_popover.aspx?artguid=736a3939-a28f-4923-9bed-2905caf7c62c, FAA Clears Most Big Jets To Land At Sea-Tac, 2024, 3 pp.

* cited by examiner

USING UNMANNED CONTROLLER EQUIPMENT TO LAUNCH AND RECOVER UNMANNED IMAGING EQUIPMENT

TECHNICAL FIELD

The subject application is related to different approaches to collecting and distributing information in networked computer systems and, for example, to receiving information collected by unmanned imaging equipment.

BACKGROUND

As network implementations have continued to increase in size and diversity, approaches to establishing connections to user equipment have increased in complexity. In some contemporary implementations, private networks, networks maintain by different carriers, networks in other countries, can all be available for connection in addition to a home network of the subscriber.

However, problems can occur when radio waves in a particular area are saturated enough that the signals experience interference.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
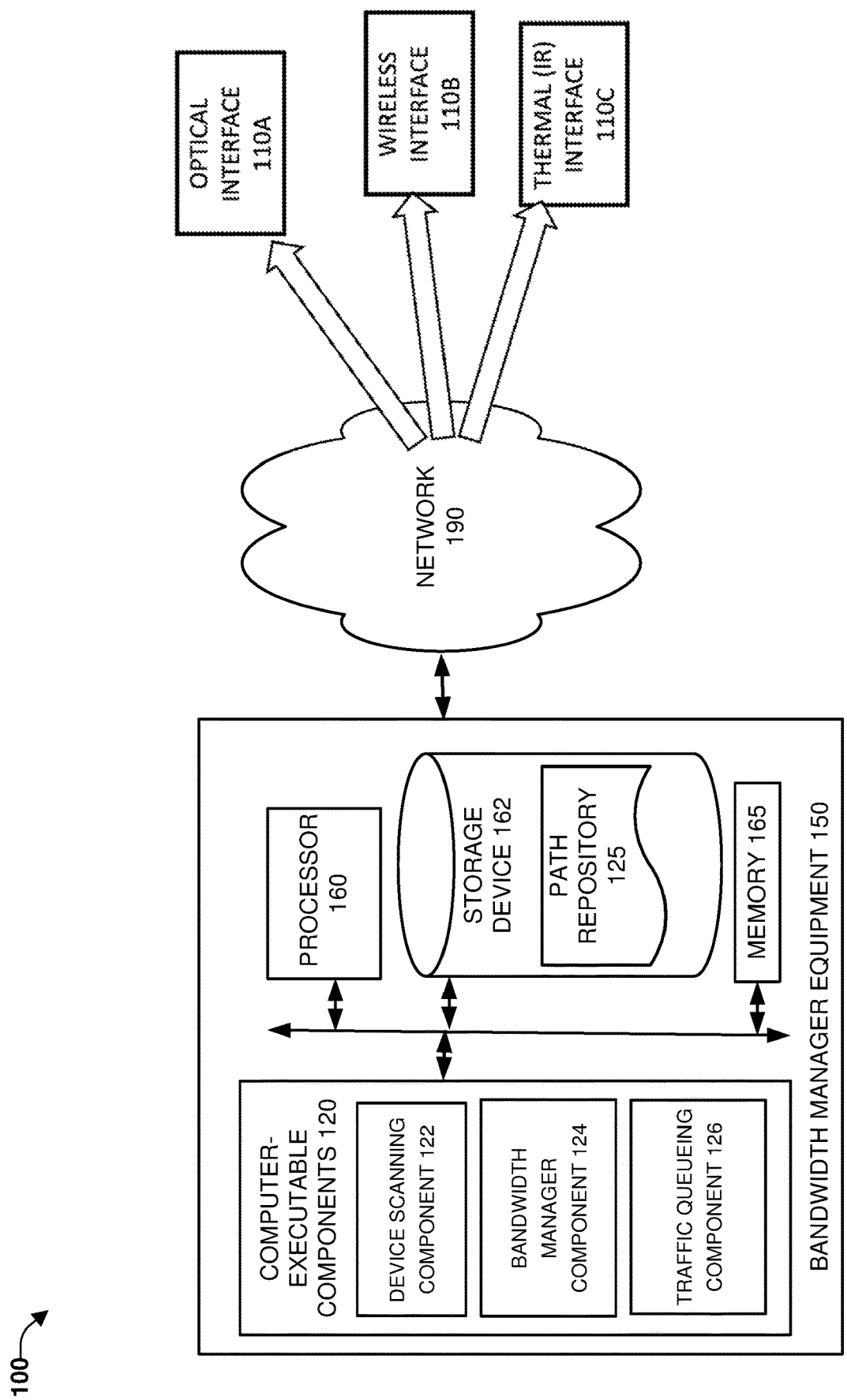
FIG. 1 is an architecture diagram of an example system that can facilitate improving connections between remote devices and an enterprise network by scanning for devices to coordinate external communication interfaces for outgoing and incoming network traffic, in accordance with one or more embodiments.

Generally speaking, one or more embodiments of a system described herein can facilitate utilizing unmanned controller equipment to launch and recover unmanned imaging equipment. In addition, one or more embodiments described herein can be directed towards a multi-connectivity framework that supports the operation of new radio (NR, sometimes referred to as 5G). As will be understood, one or more embodiments can support control and mobility functionality on cellular links (e.g., long term evolution (LTE) or NR). One or more embodiments can provide benefits including, system robustness, reduced overhead, and/or global resource management.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments, understandable variations of the non-limiting terms "signal propagation source equipment" or simply "propagation equipment," "radio network node" or simply "network node," "radio network device," "network device," and access elements are used herein. These terms may be used interchangeably and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNode B (gNB), eNode B (eNB), network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, understandable variations of the non-limiting term user equipment (UE) are used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE. Some embodiments are described in particular for 5G new radio systems. The embodiments are however applicable to any radio access technology (RAT) or multi-RAT system where the UEs operate using multiple carriers, e.g., LTE.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate coordinating the use of different forms of communication for devices to communicate via network traffic, in accordance with one or more embodiments. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate improving connections between remote devices and an enterprise network by scanning for devices to coordinate external communication interfaces for outgoing and incoming network traffic, in accordance with one or more embodiments. For purposes of brevity, description of like elements and/or processes employed in other embodiments is omitted. As depicted, system 100 includes bandwidth manager equipment 150 directing network traffic to interfaces 110A-C (respectively optical, wireless, and thermal (infrared (IR))) via network 190.

In one or more embodiments, bandwidth manager equipment 150 can include computer executable components 120, processor 160, storage device 162 and memory 165. Computer executable components 120 can include device scanning component 122, bandwidth manager component 124, traffic queueing component 126, and other components described or suggested by different embodiments described herein, that can improve the operation of system 100.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, bandwidth manager equipment 150 can further comprise various computer and/or computing-based elements described herein with reference to mobile handset 900 of FIG. 9, and operating environment 1000 of FIG. 10. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

It should be noted that one or more embodiments can be used to support a system where communications between the standard RAN can be augmented by communications via optical communications, with aspects of this combined optical/RAN system being termed herein an open optical RAN (abbreviated $O^2RAN$ in some circumstances). An example component that can be used to implement different aspects of the open optical RAN discussed herein includes a network component that can provide an access management function (AMF) to different forms of communication discussed herein.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining device scanning component 122.

In one or more embodiments, device scanning component 122 can facilitate visualizing and quantifying the environment to understand which one or more of interfaces 110A-C to activate. The sensors used can broadly include sensors typically used to identify wireless devices (e.g., RF antennas), and can also include operates a heat, visual and motion sensors, e.g., to identify from images and video whether certain forms of communication are advantageous or disadvantageous to use at a particular time. As discussed further below, the information gathered and analyzed by device scanning component 122 can facilitate different embodiments selecting scenarios for different potentially connecting devices, e.g., based on factors including, but not limited to, location, motion, length of connectivity, change of the environment, people in an environment.

Continuing this example, in one or more embodiments, computer executable components 120 can include instructions that, when executed by processor 160, can facilitate performance of operations defining bandwidth manager component 124. Based on the information determined by device scanning component 122, and the available resources of interfaces 110A-C, bandwidth manager component 124 can allocate different communications tasks to interfaces 110A-C. For example, if an image sensor detects moving people, bandwidth manager component 124 can be less likely to use optical interface 110A, e.g., because of interactions between the mode and parts of the environment. Alternatively, if optical interface 110A is detected to be close to a target user equipment, optical interface 110A and IR interface 110C can be selected. One having ordinary skill in the relevant art(s), given the description herein, appreciates that additional information and analysis approaches can also be used to select from interfaces 110A-C, e.g., based on historical data and machine learning. To facilitate the allocation, in one or more embodiments, computer executable components 120 can include instructions that, when executed by processor 160, can facilitate performance of operations defining traffic queueing component 126, e.g., that can be used by bandwidth manager component 124 to manage the distribution of communication tasks among interfaces 110A-C.

One having ordinary skill in the relevant art(s), given the disclosure herein understands that the computer processing systems, computer-implemented methods, equipment (apparatus) and/or computer program products described herein employ hardware and/or software to solve problems that are highly technical in nature (e.g., rapidly analyzing and directing traffic to interfaces for different forms of communication), that are not abstract and cannot be performed as a set of mental acts by a human. For example, a human, or even a plurality of humans, cannot efficiently perform the bandwidth management tasks described herein, with the same level of accuracy and/or efficiency as the various embodiments described herein.

Figure 2:
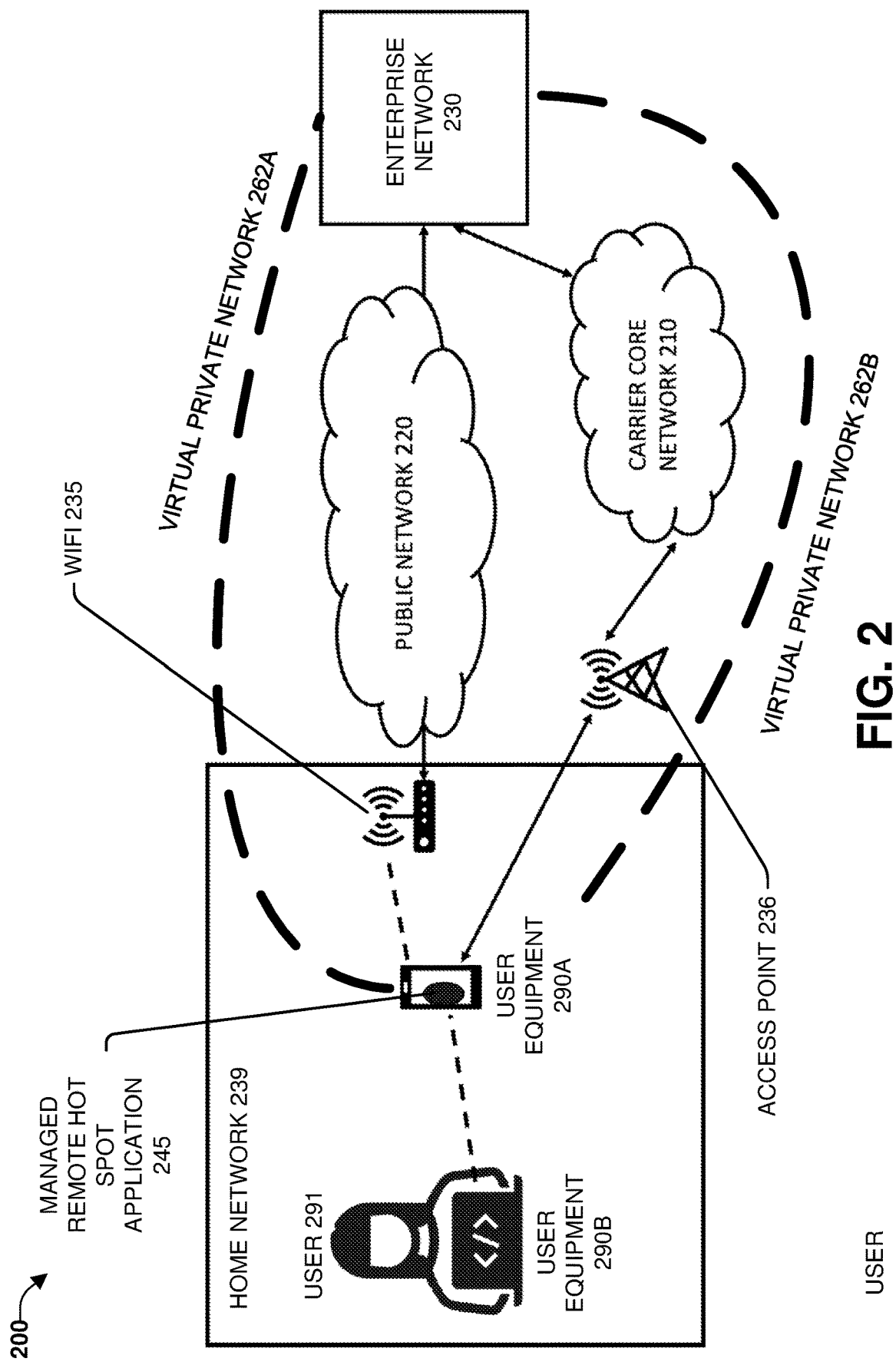
FIG. 2 is a diagram of a non-limiting example system that can facilitate improving connections between remote devices and an enterprise network by establishing multiple virtually private communications paths, in accordance with one or more embodiments.

FIG. 2 is a diagram of a non-limiting example system 200 that can facilitate improving connections between remote devices and an enterprise network by establishing multiple virtually private communications paths, in accordance with one or more embodiments. For purposes of brevity, description of like elements and/or processes employed in other embodiments is omitted.

As depicted, system 200 can include four example types of network: home network 239 connected to enterprise network 230 via public network 220 and carrier core network 210, with user 291 being shown with home network 239 having user equipment 290A-B, and WIFI 235. To use the paths via public network 220 and carrier core network 210, virtual private networks 262A-B are depicted. The connection between user equipment 290A and carrier core network 210 is facilitated by access point 236. As is described in further detail below, user equipment 290A is wirelessly connected to WIFI 235 and includes managed remote hot spot application 245, and user equipment 290B is wirelessly connected to user equipment 290A as a hot spot, e.g., via managed remote hot spot application 245.

In an example implementation described with the components of FIG. 2, user 291 is a remote worker that connects via public network 220 to enterprise network 230 for remote work with user equipment 290B, e.g., a laptop computer. In some circumstances, virtual private network 262A can be used to provide privacy for remote communications, but this can cause problems for user 291, at least because of an unfamiliar set of steps that need to be performed for a work connection (e.g., a different user experience) as compared to a connection via WIFI to enterprise network 230 at a site of the enterprise, e.g., WIFI 235 has a different service set identifier (SSID), virtual private network 262A has to be instantiated, user equipment 290A may have to be reconfigured to handle different security policies from those used onsite at the enterprise, systems and folders can require extra login steps when accessing via virtual private network 262A. In addition, characteristics of the connection discussed can provide a connection that is slower, less dynamic, and more vulnerable to outages, these characteristics including that, moving via public network 220, virtual private network 262A traffic is generally not prioritized, and can have a single path that results in a single point of failure for the connection used for remote work by user 291.

In one or more embodiments, many of the above-noted problems can be addressed by utilizing a combination of one or more of user equipment 290A (e.g., a mobile device) having managed remote hot spot application 245, and virtual private network 262B implemented via carrier core network 210, e.g., a carrier network having different paths than public network 220 in some circumstances. To illustrate these features of one or more embodiments, a non-limiting, example sequence of events is discussed below.

Generally speaking, to set up home network 239 for a less challenging (e.g., a 'plug and play' connection) work experience, managed remote hot spot application 245 can facilitate having user equipment 290A connect to WIFI 235 via an SSID different from the enterprise SSID, then provide WIFI connectivity via a remote hot spot function using the enterprise SSID for which user equipment 290B is already configured. In one or more embodiments, remote hot spot application 245 can also automatically establish virtual private network 262A, e.g., with security policies and procedures for granting access that match those for which user equipment 290B has already been configured for connection at the enterprise network 230 site.

To address problems of virtual private network performance, one or more embodiments can establish virtual private network 262B, e.g., via wireless connectivity resources of user equipment 290A connecting to access point 236. This parallel connection can be especially useful when the wireless connection with access point 236 is implemented with 5G or later RAN technology, e.g., mmWave can provide a wireless connection that is comparable to the wired connection between public network 220 and WIFI 235. In addition, managed remote hot spot application 245 and other enterprise monitoring resources, can monitor the performance of the parallel connections and, when public network 220 is lagging, additional resources of carrier core network 210 can be allocated to virtual private network 262B, e.g., to provide performance for the remote work of user equipment 290B that is more consistent and less likely to have the connection fail.

Figure 3:
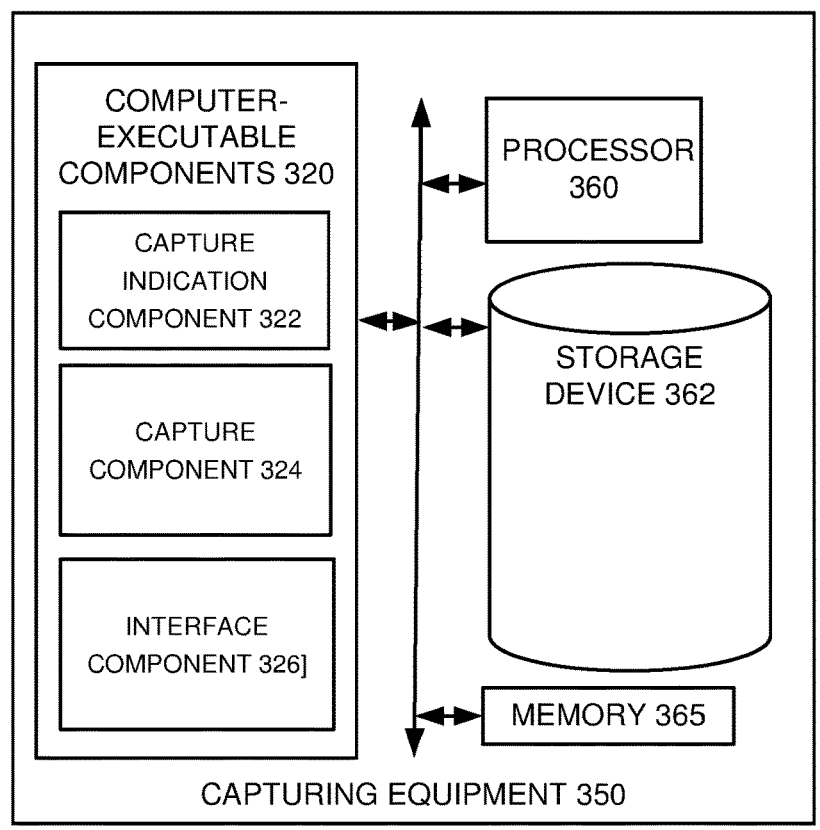
FIG. 3 is a diagram of a non-limiting example system that can utilize unmanned controller equipment to launch and recover unmanned imaging equipment, in accordance with one or more embodiments.

FIG. 3 is a diagram of a non-limiting example system 300 that can utilize unmanned controller equipment to launch and recover unmanned imaging equipment, in accordance with one or more embodiments. For purposes of brevity, description of like elements and/or processes employed in other embodiments is omitted. In one or more embodiments, capturing equipment 350 can include computer executable components 320, processor 360, storage device 362 and memory 365. Computer executable components 320 can include capture indication component 322, capture component 324, interface component 326, and other components described or suggested by different embodiments described herein, that can improve the operation of system 300.

In some implementations of radio detection and ranging (RADAR) systems, many airborne and waterborne objects are not sufficiently captured, e.g., by one or more causes that include, but are not limited to, the small radar cross section (RCS) of some objects as well as countermeasures currently used by some entities to conceal objects, these countermeasures including the use of signal absorbing materials that cover the surface of an object as well as the use of selected geometric shapes that can scatter incoming RADAR signals instead of reflecting the signals back for detection and analysis. In addition, many implementations of RADAR are limited by either being fixed at ground stations or limited by the speed of the signal collection equipment, e.g., when mounted on planes or submarines/ships. As discussed below, one or more embodiments described herein can mitigate some of these current problems. Generally speaking, one or more embodiments can provide a distributed nano-autonomous mobile RADAR system, e.g., with autonomous miniaturized data collection units that can cover vast aerial/maritime area.

In one or more embodiments, computer executable components 320 can include instructions that, when executed by processor 160, can facilitate performance of operations defining capture indication component 322. As discussed further herein, capture indication component 322 can, in accordance with one or more embodiments, receive an indication that unmanned aerial equipment is to be captured.

Further, in another example, in one or more embodiments, computer executable components 320 can include instructions that, when executed by processor 360, can facilitate performance of operations defining capture component 324. In some implementations, capture component 324 can, in accordance with one or more embodiments, based on the indication, capture the unmanned aerial equipment launched over a data collection area, resulting in captured unmanned aerial equipment.

In yet another example, computer executable components 320 can include instructions that, when executed by processor 360, can facilitate performance of operations defining interface component 326. As discussed herein, in one or more embodiments, interface component 326 can interface with the captured unmanned aerial equipment to download information associated with the data collection area collected by the unmanned aerial equipment during airborne transit over the data collection area.

Figure 4:
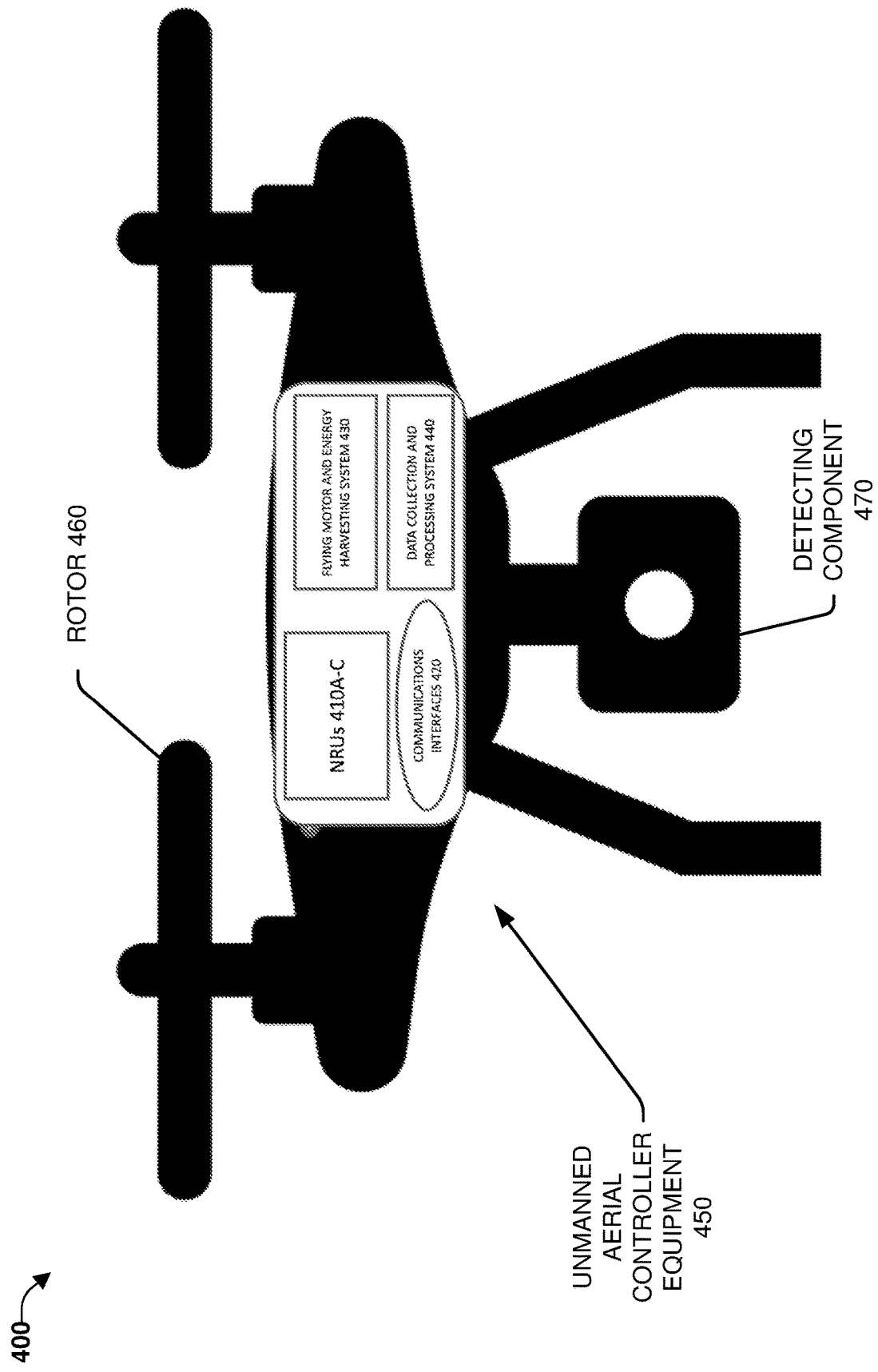
FIG. 4 is a diagram of a non-limiting example system that includes unmanned controller equipment that can launch and recover unmanned imaging equipment, in accordance with one or more embodiments.
Figure 5:
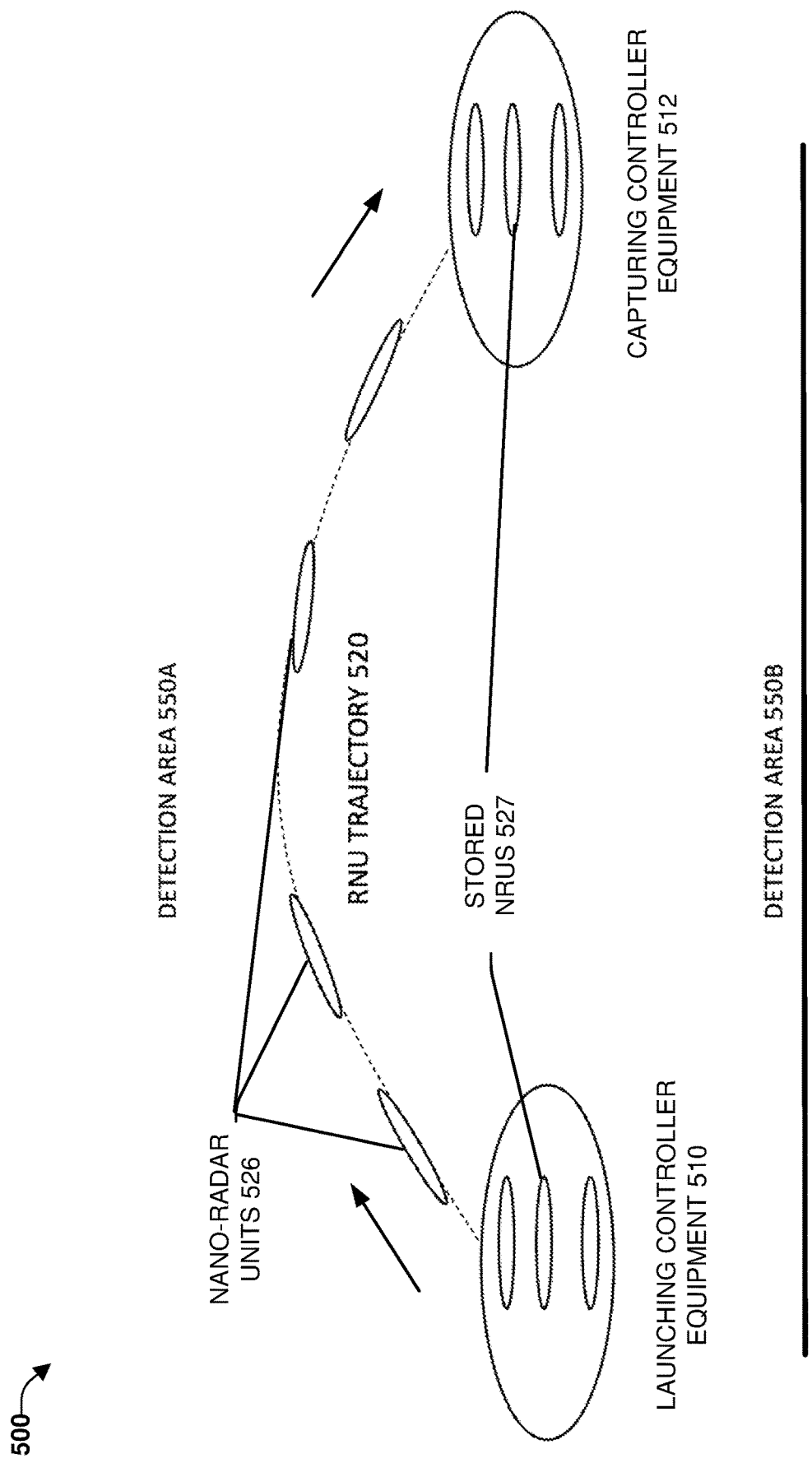
FIG. 5 is a diagram of a non-limiting example system that includes unmanned controller equipment that can launch and recover unmanned imaging equipment, in accordance with one or more embodiments.

FIGS. 4-5 are diagrams of a non-limiting example systems 400 and 500, respectively, that depicts unmanned controller equipment that can launch and can recover unmanned imaging equipment, NRUs, in accordance with one or more embodiments. As depicted, system 400 includes unmanned aerial controller equipment 450 having rotor 460 and detecting component 470. Unmanned aerial controller equipment 450 includes stored NRUs 410A-C, communications interfaces 420, flying motor and energy harvesting system 430, and data collection and processing system 440. System 500 includes launching controller equipment 510 launching NRUs 526 on RNU trajectory 520 toward capturing controller equipment 512, with the controller equipment having stored 527, e.g., stored either for launch or after capture.

In an example, launching controller equipment 510 receives an indication that imagery is needed for airborne detection are 550A and terrestrial detection area 550B. After identifying a trajectory that will result in one or more NRUs 526 being in a proper location to gather the requested information, launching controller equipment 510 can adjust its position to match the identified trajectory, and then launch the one or more NRUs 526 toward capturing controller equipment 512. It is noted that there are different ways that NRUs 526 can be launched, with one example being the use of electromagnetic force to propel NRUs 526 towards the target, e.g., using a rail gun. In one or more embodiments, NRUs 526 can be engineered to be able to withstand high speed and high heat due to the speed it will travel with because of the rail gun.

In an implementation, NRUs 526 can be self-propelled, e.g., both to extend the range of NRUs 526, and to adjust the direction of the airborne NRUs 526. Alternatively, steering of NRUs 526 can be performed by having control surfaces that are configured to facilitate the control of the NRUs, which is requested or required. Thus, in an example, a selected trajectory includes a distance between the controller equipment 510, 512 of 200 miles and, based on this selected trajectory, a launch strength is selected. In a variation of this example, if 200 miles is an upper limit on range, e.g., the maximum range, based on a launch, the NRU can use onboard power to cover the final distance. During transit, NRUs 526 capture information with onboard sensors either for the entire distance or for a distance selected based on an information request.

In this example, to end the transit of the NRUs, the NRUs can be captured by capturing controller equipment 512, e.g., based on an indication (e.g., received by detecting component 470) that the NRUs 526 were in transit from a particular direction, e.g., received by capture indication component 322. Once captured, NRUs 526 can be stored onboard and the collected data can be collected by capturing controller equipment 512, e.g., by communications interfaces 420 employed by data collection and processing system 440. In addition, after capture, NRUs 526 can have energy stores replenished by capturing controller equipment 512. In one or more embodiments, controller equipment can utilize renewable energy such as solar, ocean movements/waves for powering the systems discussed herein.

After combinations of one or more of the operations discussed above (e.g., clearing out space in sensor information storage and replenished fuel stores), NRUs 526 can be relaunched by capturing controller equipment 512 that has changed to a launching role.

Additional characteristics about systems described herein include that the controller equipment (also termed 'motherships') can be fully autonomous in terms of coordination among equipment to collect data over a deployment area. An area where shared sensor data and coordination can be used is with collision avoidance systems included in controller equipment, e.g., before launching an NRU, the motherships can scan the predicted flight area to ensure there are no objects in the vicinity. Another area where system components can coordinate operations is for the capturing of sensor information, e.g., with different equipment collecting information with different types of sensors (e.g., thermal, radio) being directed at a target area (e.g., detection areas 550A-B) from different angles. To this end, NRUs are not limited to the airborne versions discussed above, with waterborne and land-based versions operating by similar approaches, with these different types of vehicles being able to be coordinated in the collection of requested information.

Figure 6:
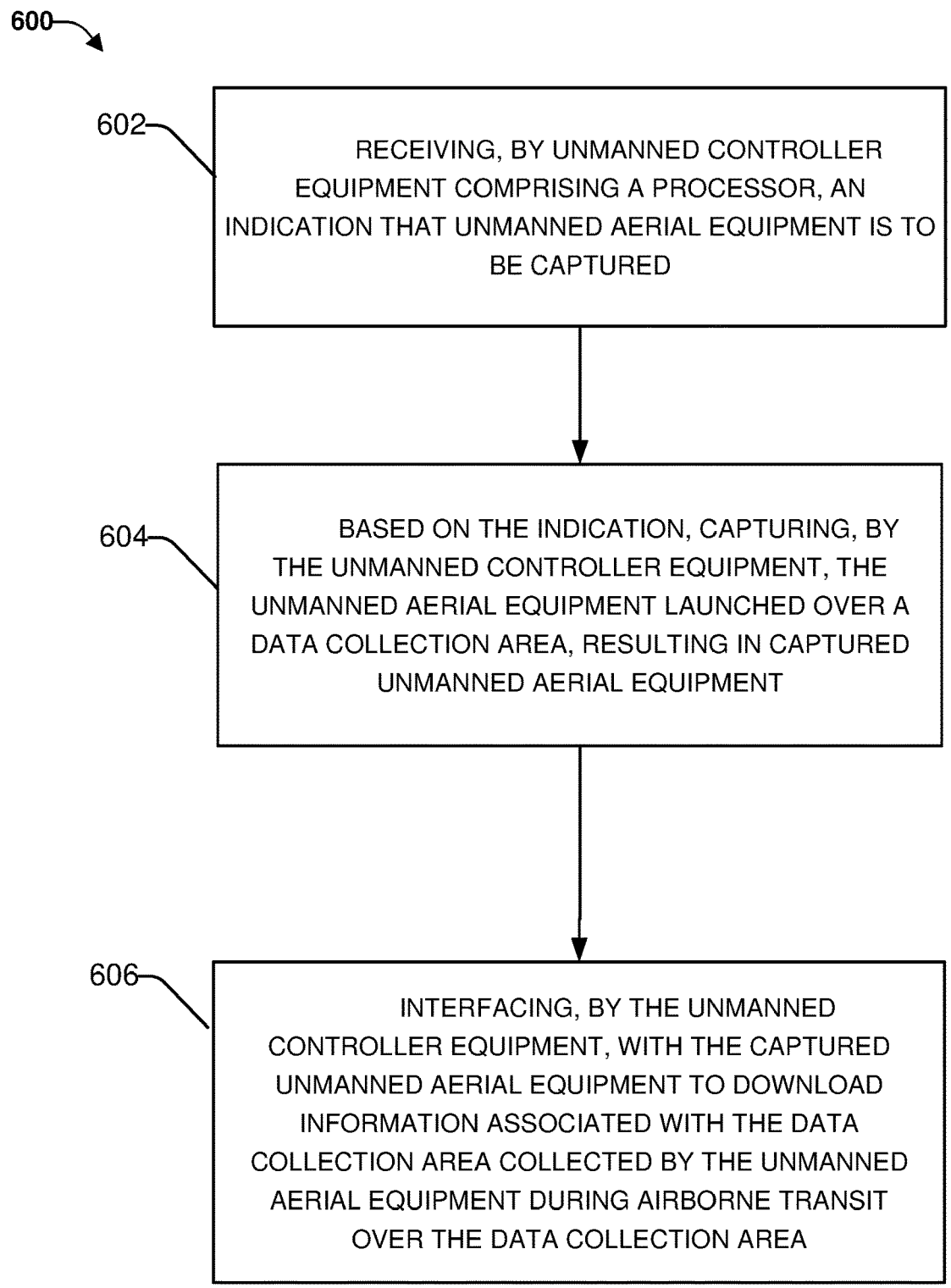
FIG. 6 illustrates an example method that can facilitate utilizing unmanned controller equipment to launch and recover unmanned imaging equipment, in accordance with one or more embodiments.

FIG. 6 illustrates an example method 600 that can facilitate utilizing unmanned controller equipment to launch and recover unmanned imaging equipment, in accordance with one or more embodiments. For purposes of brevity, description of like elements and/or processes employed in other embodiments is omitted.

At 602, method 600 can include receiving an indication that unmanned aerial equipment is to be captured. At 604, method 600 can include, based on the indication, capturing the unmanned aerial equipment launched over a data collection area, resulting in captured unmanned aerial equipment. At 606, method 600 can include interfacing with the captured unmanned aerial equipment to download information associated with the data collection area collected by the unmanned aerial equipment during airborne transit over the data collection area.

In additional or alternative embodiments, the captured unmanned aerial equipment was launched by second unmanned controller equipment, e.g., launching controller equipment 510 of FIG. 5.

In additional or alternative embodiments the method can further include, before the captured unmanned aerial equipment was launched, facilitating, by the first unmanned controller equipment, communicating, to the second unmanned controller equipment, a capture location for capture of the captured unmanned aerial equipment, with the second unmanned controller equipment being launched the captured unmanned aerial equipment based on the capture location and the data collection area.

In additional or alternative embodiments, the method can further include, based on an identified data collection target, selecting, by the first unmanned controller equipment, the data collection area, and facilitating, by the first unmanned controller equipment, requesting the second unmanned controller equipment to launch the unmanned aerial equipment to collect the information associated with the data collection area.

In additional or alternative embodiments, the method can further include, identifying, by the first unmanned controller equipment, a data collection target, resulting in the identified data collection target.

In additional or alternative embodiments, the method can further include, facilitating, by the first unmanned controller equipment, a scanning of airspace over the data collection area between the first unmanned controller equipment and the second unmanned controller equipment for potential obstructions, resulting in airspace information, and based on the airspace information, determining, by the first unmanned controller equipment, the capture location.

In additional or alternative embodiments, the unmanned aerial equipment was launched further based on the airspace information.

In additional or alternative embodiments, the captured unmanned aerial equipment traveled from the second unmanned controller equipment to the first unmanned controller equipment without use of onboard propulsion.

In additional or alternative embodiments, the captured unmanned aerial equipment was launched using an electromagnetic force exerted by a launching component.

In additional or alternative embodiments, the captured unmanned aerial equipment traveled from the second unmanned controller equipment to the first unmanned controller equipment based on onboard propulsion capability from a power source onboard the captured unmanned aerial equipment.

In additional or alternative embodiments, the data collection area can include a first data collection area and the information can include renewing, by the first unmanned controller equipment, the power source of the captured unmanned aerial equipment relaunching, by the first unmanned controller equipment to collect additional information associated with the same or a different data collection area.

In additional or alternative embodiments, the unmanned controller equipment can include unmanned aerial controller equipment.

Figure 7:
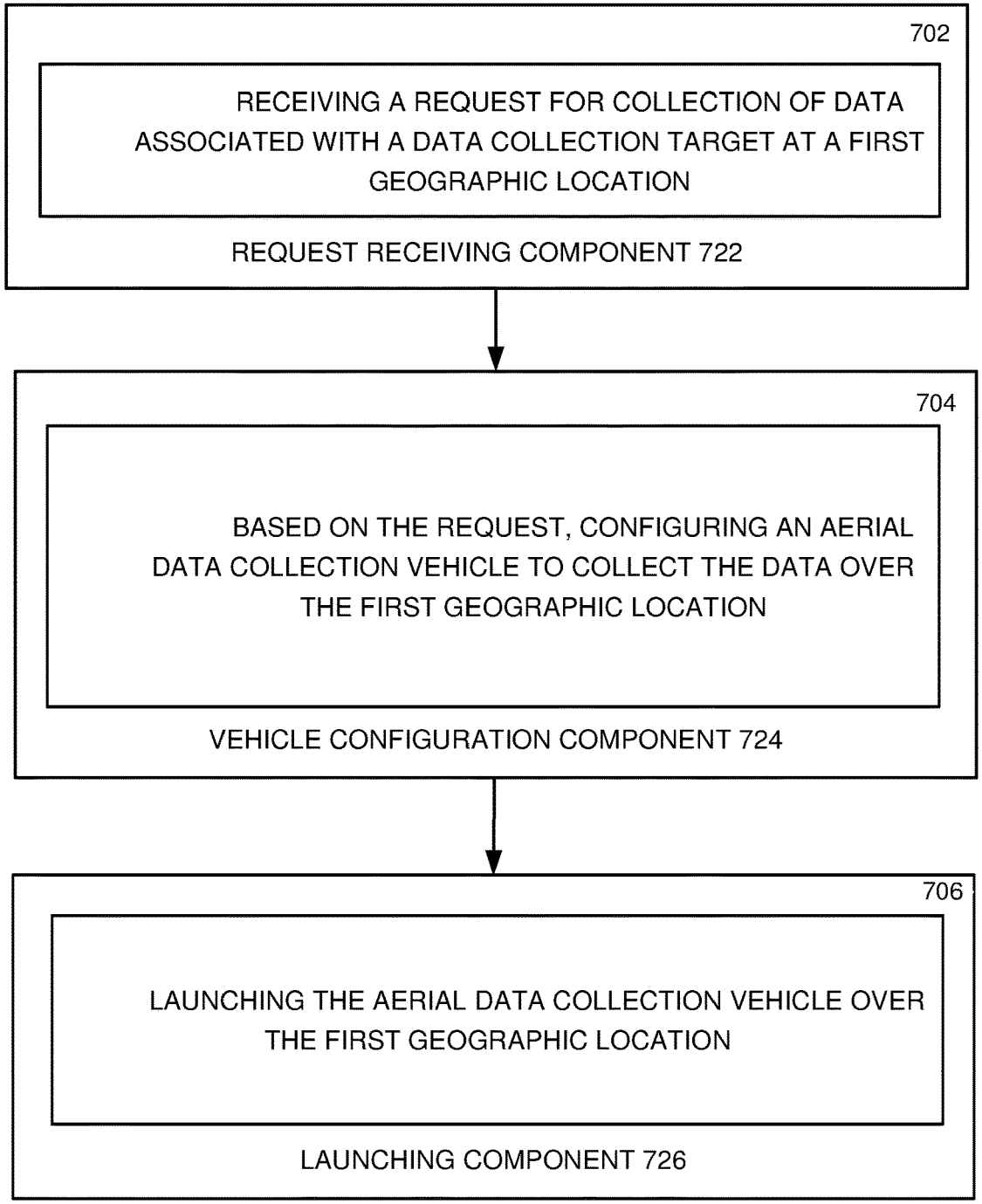
FIG. 7 depicts a system 700 that can facilitate the use of unmanned controller equipment to launch and recover unmanned imaging equipment, in accordance with one or more embodiments.

FIG. 7 depicts a system 700 that can facilitate the use of unmanned controller equipment to launch and recover unmanned imaging equipment, in accordance with one or more embodiments. For purposes of brevity, description of like elements and/or processes employed in other embodiments is omitted. As depicted, system 700 can include unmanned aerial vehicle with components including, but not limited to, request receiving component 722, vehicle configuration component 724, bandwidth manager component 726, and other components described or suggested by different embodiments described herein, that can improve the operation of system 700.

In an example, component 702 can include the functions of request receiving component 722, supported by the other layers of system 700. For example, component 702 can receive a request for collection of data associated with a data collection target at a first geographic location. In this and other examples, component 704 can include the functions of vehicle configuration component 724, supported by the other layers of system 700. Continuing this example, in one or more embodiments, component 704 can, based on the request, configure an aerial data collection vehicle to collect the data over the first geographic location. In an example, component 706 can include the functions of launching component 726, supported by the other layers of system 700. For example, component 706 can launch the aerial data collection vehicle over the first geographic location. In alternative or additional embodiments, the aerial data collection vehicle can be configured for reception by a second unmanned aerial vehicle.

Alternative or additional embodiments can include operations that identify clear airspace for transit of the aerial data collection vehicle for transit over the first geographic location to the reception, resulting in identified clear airspace, and the launching can be performed with respect to the identified clear airspace.

Alternative or additional embodiments can include operations that notify the second unmanned aerial vehicle of the launching.

Figure 8:
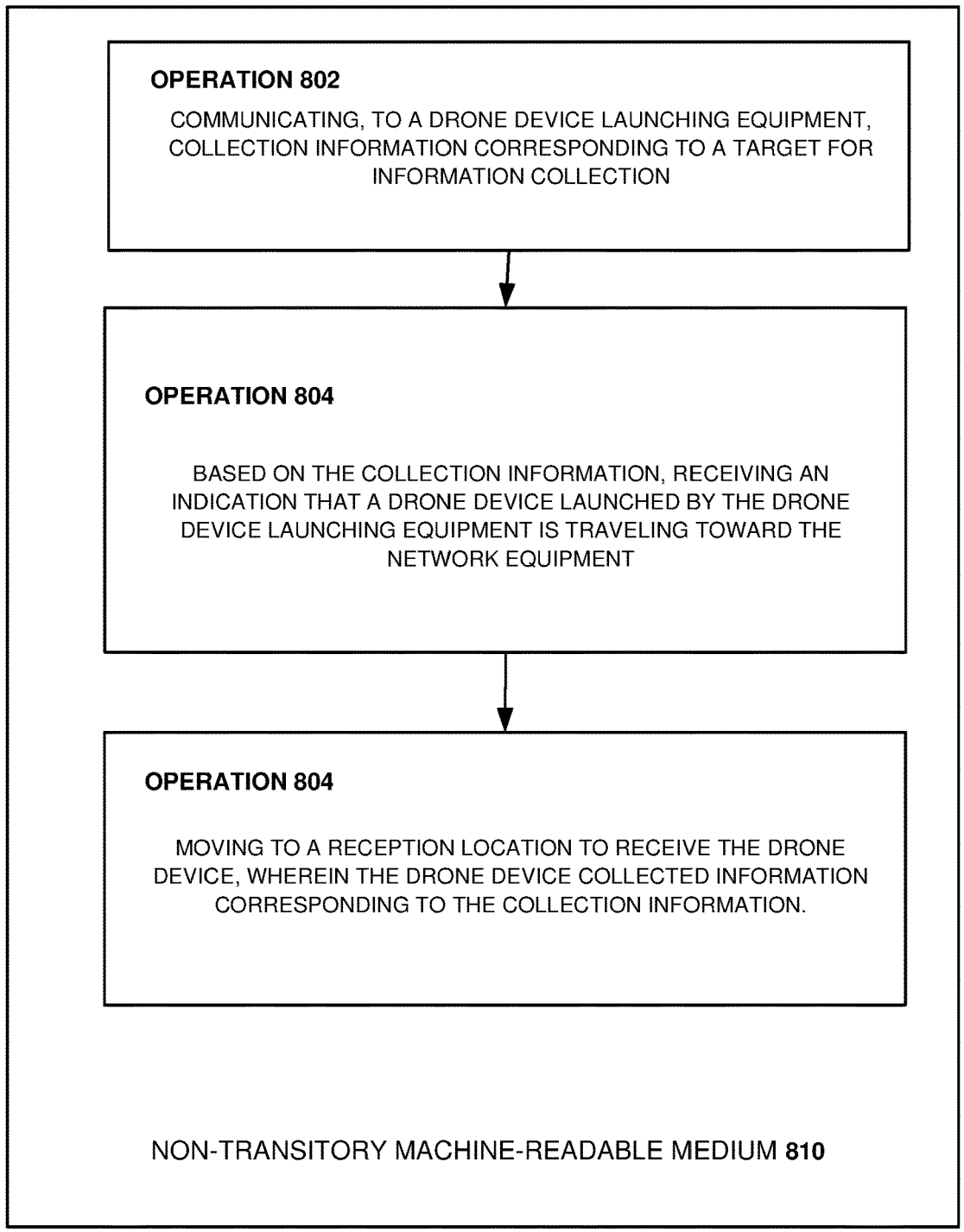
FIG. 8 depicts an example 800 non-transitory machine-readable medium that can include executable instructions that, when executed by a processor of a system, facilitate using unmanned controller equipment to launch and recover unmanned imaging equipment, in accordance with one or more embodiments described above.

FIG. 8 depicts an example 800 non-transitory machine-readable medium 810 that can include executable instructions that, when executed by a processor of a system, facilitate using unmanned controller equipment to launch and recover unmanned imaging equipment, in accordance with one or more embodiments described above. For purposes of brevity, description of like elements and/or processes employed in other embodiments is omitted. As depicted, non-transitory machine-readable medium 810 includes executable instructions that can facilitate performance of operations 802-806.

In one or more embodiments, the operations can include operation 802 that can communicate to a drone device launching equipment, collection information corresponding to a target for information collection. Operations can further include operation 804, that can, based on the collection information, receive an indication that a drone device launched by the drone device launching equipment is traveling toward the network equipment. In one or more embodiments, the operations can include operation 806 that can, in one or more embodiments, move to a reception location to receive the drone device, wherein the drone device collected information corresponding to the collection information.

In alternative or additional embodiments, the network equipment can include airborne drone device controller equipment.

Alternative or additional embodiments can include operations that receive, from the drone device, the information corresponding to the collection information.

Alternative or additional embodiments can include operations that scan an airspace over the target for an object with a potential to be impacted by the drone device while traveling toward the network equipment, with the collection information including object information corresponding to the object, and with the drone device being launched based on an evaluation of the object information by the drone device.

Figure 9:
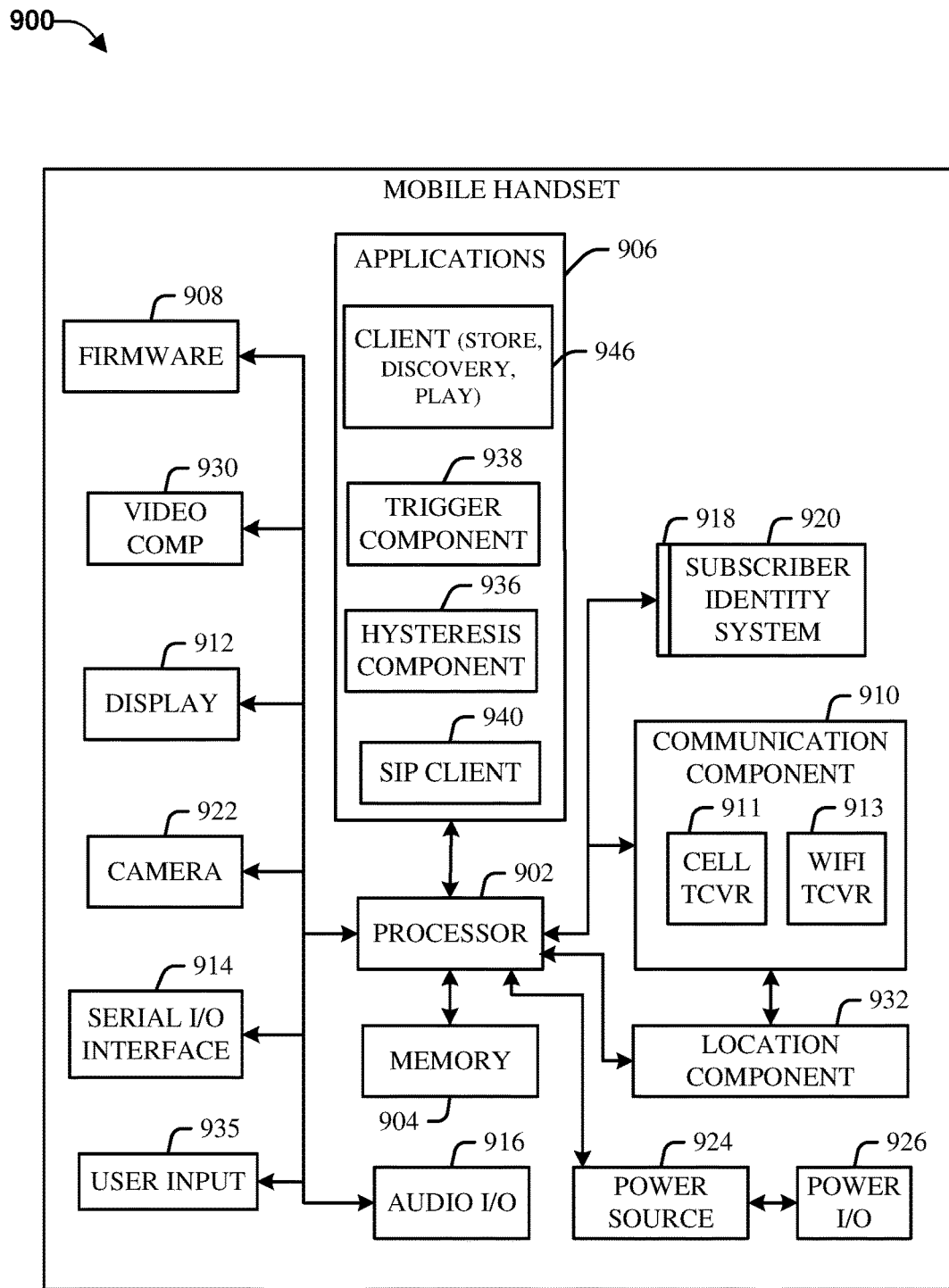
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card SIM or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
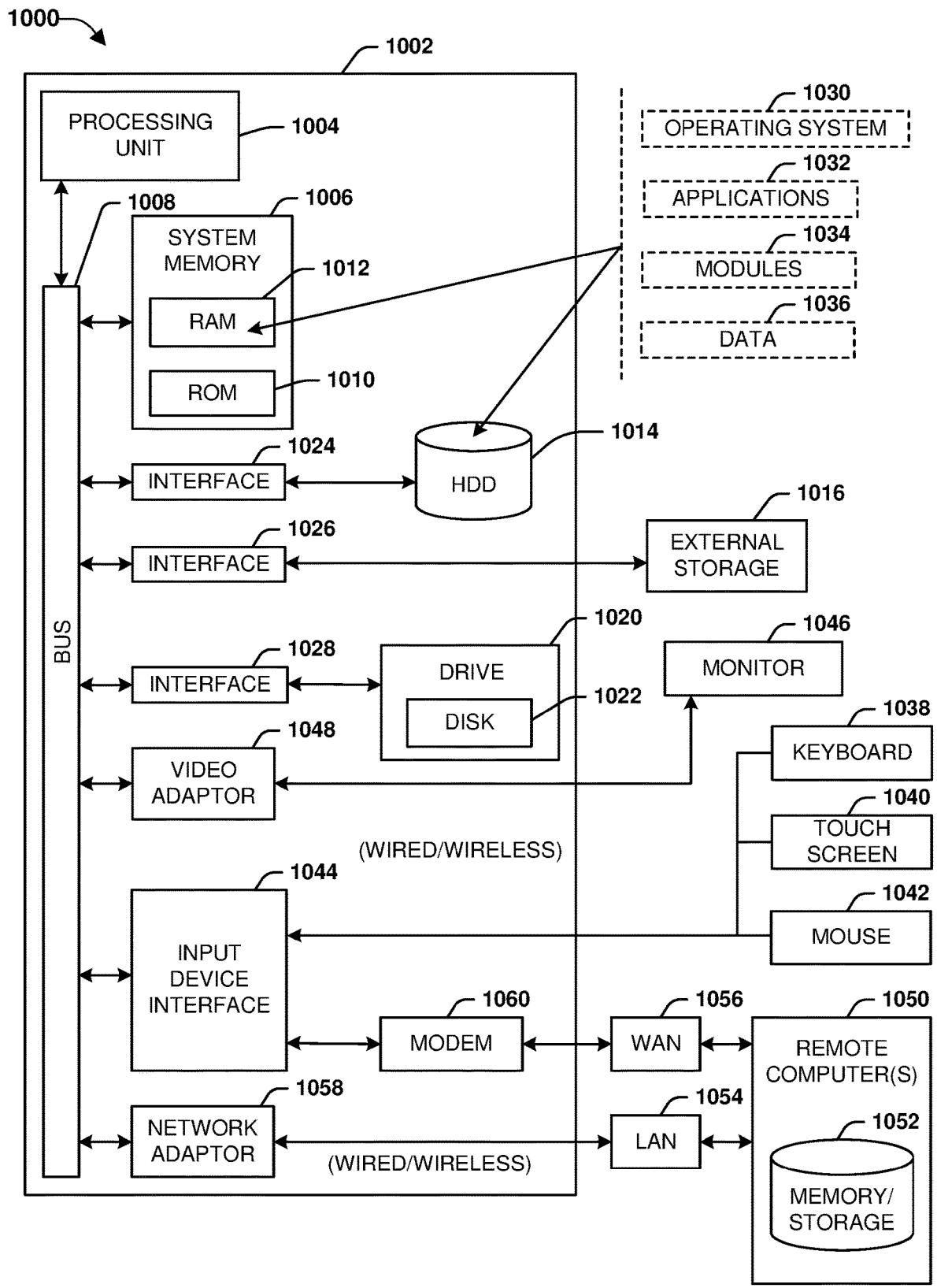
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
    determining, by unmanned controller equipment, a first trajectory associated with a first unmanned aerial equipment;
    communicating, by the unmanned controller equipment, to a second unmanned controller equipment the first trajectory, wherein the second unmanned controller equipment configures a second unmanned aerial equipment according to a second trajectory, wherein the second trajectory is different than the first trajectory, wherein the second unmanned controller launches the second unmanned aerial equipment according to the second trajectory;
    receiving, by the unmanned controller equipment comprising a processor, an indication that the second unmanned aerial equipment is to be captured;
    based on the indication, capturing, by the unmanned controller equipment, the second unmanned aerial equipment launched over a data collection area, resulting in captured unmanned aerial equipment; and
    interfacing, by the unmanned controller equipment, with the captured unmanned aerial equipment to download information associated with the data collection area collected by the second unmanned aerial equipment during airborne transit over the data collection area.

2. The method of claim 1, wherein the unmanned controller equipment comprises a first unmanned controller equipment.

3. The method of claim 2, further comprising, before the captured unmanned aerial equipment was launched, facilitating, by the first unmanned controller equipment, communicating, to the second unmanned controller equipment, a capture location for capture of the captured unmanned aerial equipment, wherein the second unmanned controller equipment launched the captured unmanned aerial equipment based on the capture location and the data collection area.

4. The method of claim 3, further comprising:
    based on an identified data collection target, selecting, by the first unmanned controller equipment, the data collection area; and
    facilitating, by the first unmanned controller equipment, requesting the second unmanned controller equipment to launch the second unmanned aerial equipment to collect the information associated with the data collection area.

5. The method of claim 4, further comprising, identifying, by the first unmanned controller equipment, a data collection target, resulting in the identified data collection target.

6. The method of claim 3, further comprising,
    facilitating, by the first unmanned controller equipment, a scanning of airspace over the data collection area between the first unmanned controller equipment and the second unmanned controller equipment for potential obstructions, resulting in airspace information; and
    based on the airspace information, determining, by the first unmanned controller equipment, the capture location.

7. The method of claim 6, wherein the first unmanned aerial equipment was launched further based on the airspace information.

8. The method of claim 2, wherein the captured unmanned aerial equipment traveled from the second unmanned controller equipment to the first unmanned controller equipment without use of onboard propulsion.

9. The method of claim 8, wherein the captured unmanned aerial equipment was launched using an electromagnetic force exerted by a launching component.

10. The method of claim 2, wherein the captured unmanned aerial equipment traveled from the second unmanned controller equipment to the first unmanned controller equipment based on onboard propulsion capability from a power source onboard the captured unmanned aerial equipment.

11. The method of claim 10, wherein the data collection area comprises a first data collection area and the information comprises first information, and wherein the method further comprises:
    renewing, by the first unmanned controller equipment, the power source of the captured unmanned aerial equipment; and
    relaunching, by the first unmanned controller equipment, the captured unmanned aerial equipment to collect second information associated with a second data collection area.

12. The method of claim 1, wherein the unmanned controller equipment comprises second unmanned aerial controller equipment.

13. A first unmanned aerial vehicle, comprising:
    a processor; and a memory that stores executable instructions that, when executed by the processor, facilitate performance of operations, comprising:
  determining a first trajectory associated with a first aerial data collection vehicle;
  receiving a request for collection of data associated with a data collection target at a geographic location,
  based on the request, configuring a second aerial data collection vehicle to collect the data over the geographic location according to a second trajectory, wherein the second trajectory is different than the first trajectory, and
  launching the aerial data collection vehicle over the geographic location.

14. The first unmanned aerial vehicle of claim 13, wherein configuring the second aerial data collection vehicle comprises configuring the second aerial data collection vehicle for reception by a second unmanned aerial vehicle.

15. The first unmanned aerial vehicle of claim 14, wherein the operations further comprise, identifying clear airspace for transit of the second aerial data collection vehicle for transit over the geographic location to the reception, resulting in identified clear airspace, and wherein the launching is performed with respect to the identified clear airspace.

16. The first unmanned aerial vehicle of claim 14, wherein the operations further comprise notifying the second unmanned aerial vehicle of the launching.

17. A non-transitory machine-readable medium, comprising executable instructions that, when executed by a processor of network equipment, facilitate performance of operations, comprising:
  communicating, to a drone device launching equipment, collection information corresponding to a target for information collection, wherein the collection information comprises a first trajectory associated with a first drone device, wherein a second drone device is configured by the drone device launching equipment according to a second trajectory, wherein the second trajectory is different than the first trajectory;
  based on the collection information, receiving an indication that thea second drone device launched by the drone device launching equipment is traveling toward the network equipment; and
  moving to a reception location to receive the drone device, wherein the drone device collected information corresponding to the collection information.

18. The non-transitory machine-readable medium of claim 17, wherein the network equipment comprises airborne drone device controller equipment.

19. The non-transitory machine-readable medium of claim 17, wherein the operations further comprise, receiving, from the second drone device, the information corresponding to the collection information.

20. The non-transitory machine-readable medium of claim 17, wherein the operations further comprise scanning an airspace over the target for an object with a potential to be impacted by the second drone device while traveling toward the network equipment, wherein the collection information comprises object information corresponding to the object, and wherein the second drone device was launched based on an evaluation of the object information by the second drone device.

* * * * *